W. S. LANE.
Sheep-Shearing Device.
No. 82,533. Patented Sept. 29, 1868.
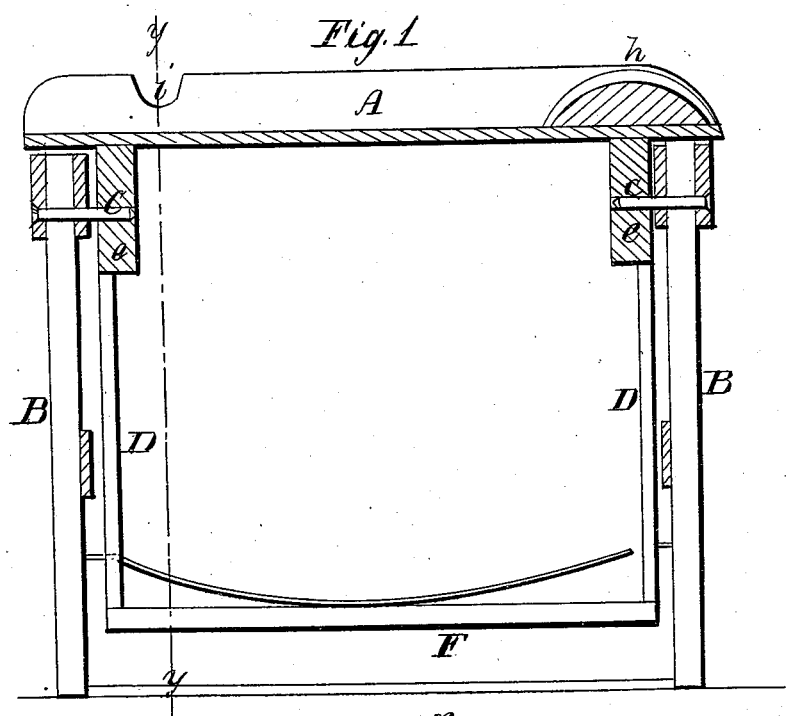
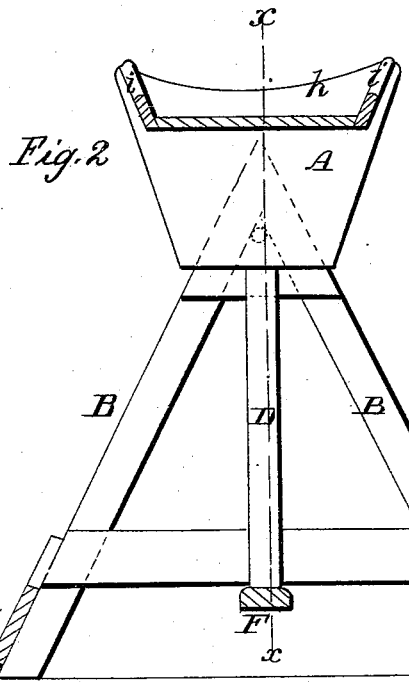

United States Patent Office.

WILLIAM S. LANE, OF BEAVER DAM, NEW YORK.

Letters Patent No. 82,533, dated September 29, 1868.

IMPROVEMENT IN SHEEP-SHEARING DEVICE.

*The Schedule referred to in these Letters Patent and making part of the same.*

TO ALL WHOM IT MAY CONCERN:

Be it known that I, WILLIAM S. LANE, of Beaver Dam, in the county of Schuyler, and State of New York, have invented a new and improved Sheep-Shearing Device; and I do hereby declare that the following is a full, clear, and exact description thereof, which will enable those skilled in the art to make and use the same, reference being had to the accompanying drawings, forming part of this specification.

This invention relates to a device to aid in the operation of shearing sheep, whereby that difficult performance is greatly facilitated; and the invention consists in providing an elevated trough in which to secure the sheep, so constructed and arranged that the position of the trough may be changed by the foot of the operator, as will be hereinafter described.

Figure 1 is a longitudinal vertical section of the trough, and the frame by which it is supported, showing the construction of the same, and the manner in which it is operated, the section being through the line $x\ x$ of fig. 2.

Figure 2 is a vertical cross-section of fig. 1, through the line $y\ y$.

Similar letters of reference indicate corresponding parts.

A is the trough, which is supported by the frame B, on pivots C C.

D D are pendent arms, attached to the brackets $e\ e$, and connected together by the bar F, as seen in the drawing.

The frame is triangular in form, as seen in fig. 2, the upper angle, $g$, being near the bottom of the trough, so that the trough can be tipped either way without interfering with the frame.

When in use, the sheep to be sheared is laid in the trough, its head or neck lying on the rounded or raised portion, $h$, and its hinder legs (either one or both) being secured in the recesses $i$ in the sides of the trough.

In this condition, the shearer places his foot upon the bar F, and by pressing on the bar he turns or tips the trough and alters the position, so as to accommodate himself and aid in the operation.

The sheep may be turned over in the trough, so as to expose all the wool in a convenient position for shearing.

By the use of this machine the shearer stands up to his work, and, while the sheep is securely fastened, he alters and changes its position by the motion of his foot, thus being enabled to perform more labor of this kind (in a given time) than by any other means known.

I claim as new, and desire to secure by Letters Patent—

A trough for shearing sheep, in combination with a frame, so arranged that it may be adjusted by the foot to suit the operator, and substantially in the manner herein shown and described.

The above specification of my invention signed by me, this 20th day of May, 1868.

WILLIAM S. LANE.

Witnesses:
FRANK BLOCKLEY,
ALEX. F. ROBERTS.